United States Patent [19]

Wall, Jr. et al.

[11] 4,118,620
[45] Oct. 3, 1978

[54] COMPUTERIZED SYSTEM FOR TRANSLATING A TORCH HEAD

[76] Inventors: Alan M. Lovelace, Acting Administrator of the National Aeronautics and Space Administration, with respect to an invention of William A. Wall, Jr.; Robert E. Ives; Miles Melvin Bruce, Jr.; Peter Paul Pryor, Jr.; Leslie H. Gard, all of Huntsville, Ala.

[21] Appl. No.: 799,023

[22] Filed: May 20, 1977

[51] Int. Cl.² .............................................. B23K 9/12
[52] U.S. Cl. .......................... 219/124.32; 219/124.22; 219/124.33; 219/125.1; 228/8
[58] Field of Search ........... 219/124.1, 124.21, 124.22, 219/124.31, 124.32, 124.33, 124.34, 124.4; 266/58, 60, 67, 71, 73; 228/7, 8, 9, 12

[56] References Cited

U.S. PATENT DOCUMENTS

| | | | |
|---|---|---|---|
| 2,927,195 | 3/1960 | Arnaud | 219/124.32 |
| 3,126,472 | 3/1964 | Brems | 219/124.22 |
| 3,229,883 | 1/1966 | Yost | 266/67 |
| 3,373,914 | 3/1968 | Wall, Jr. | 219/124.22 |
| 3,443,732 | 5/1969 | Wall, Jr. et al. | 219/124.33 |
| 3,469,068 | 9/1969 | Wall, Jr. | 219/124.22 |

*Primary Examiner*—C. L. Albritton
*Assistant Examiner*—Clifford C. Shaw
*Attorney, Agent, or Firm*—J. H. Beumer; J. R. Manning; L. D. Wofford, Jr.

[57] ABSTRACT

A computerized system for translating a torch head tip at a constant travel speed along a contoured workpiece including a driven skate characterized by an elongated bed, a pair of independently pivotal trucks connected to the bed in supporting relation therewith and mounted on a contoured track of an arbitrary configuration in mutually spaced relation, an axially extensible torch head manipulator arm mounted on the bed of the carriage and projected perpendicularly from the midportion thereof and having a torch head mounted at its distal end, and a real-time computerized control drive subsystem to advance the skate along the track at a variable rate for maintaining a constant speed for the torch head tip and to position the torch axis relative to a preset angle to the workpiece.

6 Claims, 7 Drawing Figures

COMPUTERIZED SYSTEM FOR TRANSLATING A TORCH HEAD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention relates to real-time automatic systems for performing welding operations and more particularly to an improved computerized system for translating a torch head tip at a constant speed along a contoured path extending in a direction generally common, but not necessarily similar, to the surface of an adjacently related elongated workpiece of a contoured configuration.

One of the numerous problems encountered in automatically welding parts which are neither straight nor uniformly round is that geometric relationships existing between the welder and the part to be welded can cause large variations in weld speed to occur. Unless, of course, counter measures are taken, these variations often result in nonuniform weld nuggets with an attendant loss of reliability. Since in most automatic commercial welding systems power supplies and controls are designed to maintain constant current, voltage, and travel speed, the welding of a straight or round piece does not present a control problem simply because the heat applied in watts per centimeter of weld length is a constant value. However, if a part to be welded is neither straight nor uniformly round, the surface speed of the torch tip usually will not be constant. A weld joint which is straight and progresses into a curved section is especially susceptible to weld-speed error. The same is true of elliptical bulkheads.

2. Description of the Prior Art

Computerized weld skates with torch angle and weld-speed control heretofore have been employed with varying degrees of success. Such systems are shown and described in U.S. Pat. Nos. 3,443,732 and 3,469,068.

While the patented systems aforementioned have performed satisfactorily for their intended purpose, generally speaking it has been found that certain disadvantages are encountered when employing these systems. For example, in the weld skate described in U.S. Pat. No. 3,469,068, the torch tip tends to exhibit instability whenever the rollers supporting the skate cross a joint in the skate track. Apparently, this perturbation is caused by the three-point wheel trucks which tend to move in an unpredicted manner and is multiplied by cantilever action of the torch head. The result is unwanted movement of the torch head along, and perpendicular to, the plane of the weld joint. Additionally, the system also includes a track radius transducer which is used to measure the instantaneous radius of the skate track. Consequently, the system is extremely sensitive and suspect of being inaccurate. Moreover, the system necessarily is expensive to fabricate, maintain and operate.

Additionally, numerically controlled welding systems requiring hard, fixed X, Y and Z axis reference points to maintain accuracy have been employed, also with varying degrees of success.

A primary disadvantage of numerical control welding machines, of course, is the high cost of precision tooling required to establish the X, Y and Z axis reference points and the large engineering cost of programming and verifying each different weld configuration prior to production. Moreover, a numerical control welding tool is by design necessarily limited in the size of workpiece it can process.

It is, therefore, the general purpose of the instant invention to provide an improved computerized welding system including a subsystem operable to translate a torch tip at a constant travel speed and torch angle along a contoured track, in accordance with real-time outputs of a digital computer control circuit.

OBJECTS AND SUMMARY OF THE INVENTION

It is, therefore, an object of the instant invention to provide an improved automatic welding system for translating a torch head tip along a contoured path at a constant travel speed and maintaining the torch axis orientation to the workpiece constant.

Another object is to provide in a computerized system for translating a torch head, an improved driven skate for supporting the head, and an improved control circuit for maintaining a constant rate of motion for the head tip as it is translated by the skate.

Another object is to provide in a computerized system for translating a torch head at a fixed rate along a path extended in close proximity to a work surface of a contoured configuration, an elongated track of a contoured configuration extended in a direction generally common with the surface, a skate mounted on the arbitrary track, and means for driving the skate at a rate such that a constant travel speed is imposed on the torch head tip.

Another object is to provide a computerized system for translating a working head of a truck-supported welding torch at a constant rate of motion in a given direction along a contoured path extended in close proximity with a non-uniformly curved surface of an elongated workpiece at a variable speed in accordance with an output derived from a digital computer adapted to continuously provide output resulting from a mathematical solution of the equation:

$$V_c = R/R_1 (\sqrt{V_T^2 - V_R^2 \cos^2\theta_{sys}} - V_R \sin\theta_{sys})$$

where $V_c$ = the required instantaneous speed for the skate, and where $$\frac{R}{R_1} = \frac{2\cos\theta_2}{\sqrt{\left[1 + \left(\frac{L}{A}\right)^2\right]\sin^2(\theta_1 + \theta_2) + 4\cos\theta_1 \cos\theta_2 \left[\cos(\theta_1 + \theta_2) - \frac{L}{A}\sin(\theta_1 + \theta_2)\right]}}$$

where
$V_T$ = velocity vector of said working head torch tip
$V_R$ = velocity vector of said arm necessary for maintaining correct proximity of said torch tip to workpiece $\theta_{sys}$ = theoretical angle subtended by the total system velocity vector, $V_{sys}$, and the SRL $L$ = distance between weld torch tip and the SRL $A$ = one-half of distance between the truck axes $\theta_1$ = angle of SRL with respect to a tangent to the track at the driven end of the skate $\theta_2$ = angle of SRL with respect to a tangent to the track at the opposite end of the skate.

and where all above mathematical variables are referenced to an imaginary straight line herein referred to as the Skate Reference Line (SRL), extended through the rotational axes of supporting trucks for a skate.

These together with other objects and advantages are achieved through the use of a driven skate including an elongated bed and a pair of independently pivotal trucks connected to the bed in supporting relation therewith and mounted on a straight or contoured track in a mutually spaced relation, a torch head manipulator arm mounted on the bed at the midportion thereof in fixed perpendicular relation therewith, a torch angle manipulator head mounted at the distal end of the arm, and drive means for advancing the skate along the track at a variable rate dictated by real-time digital computer control output provided for advancing the skate at a variable rate in order to maintain a constant velocity for the torch head tip as the skate is advanced along the track, and means for manipulating the torch head such that proper orientation of the torch angle to the work surface is maintained in order to help assure consistent weld quality.

DESCRIPTION OF THE PREFERRED EMBODIMENT

Figure 1:
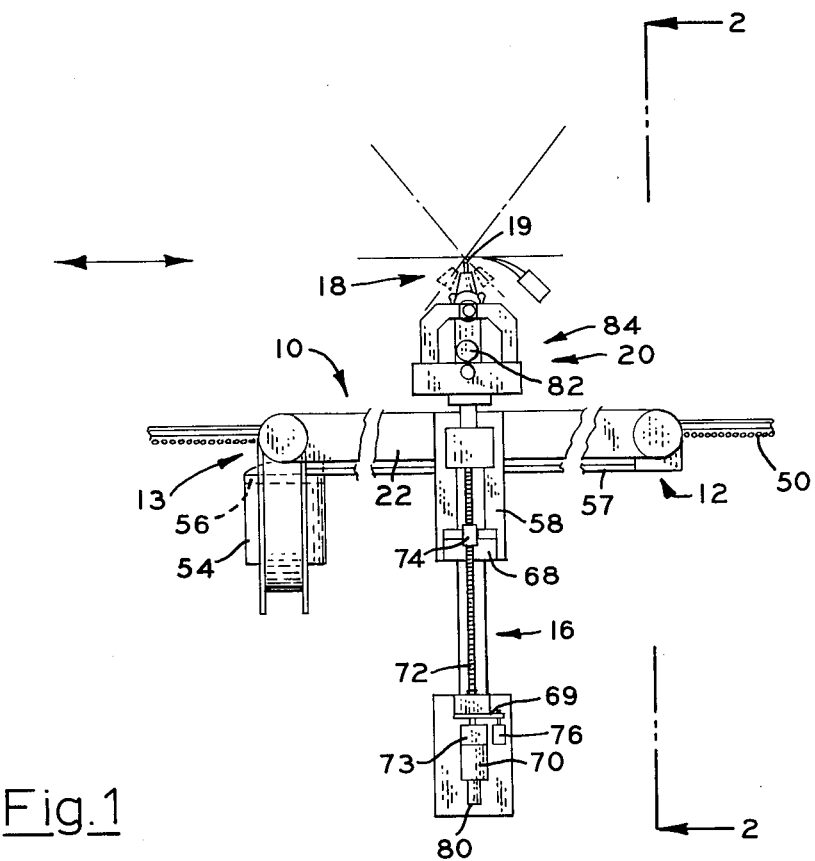
FIG. 1 is a top plan view of a torch head mounted on a torch head manipulator arm and supported by a skate, not to scale, of a computerized system which embodies the principles of the instant invention.

Referring now to the drawings, with more particularity, wherein like reference characters designate like or corresponding parts throughout the several views, there is shown in FIG. 1 a computerized system which embodies the principles of the instant invention.

Figure 2:
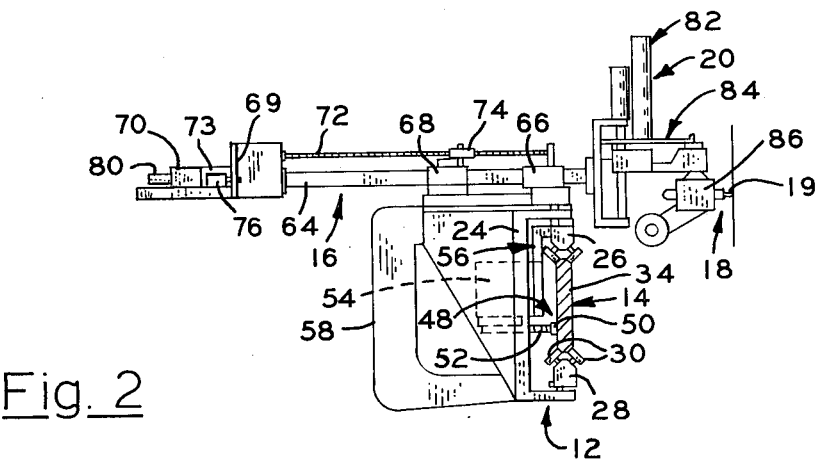
FIG. 2 is a cross-sectional view taken generally along lines 2—2 of FIG. 1.

As shown in FIGS. 1 and 2, the system includes a carriage, generally designated 10, supported by a pair of trucks, designated 12 and 13, mounted on a track 14. Extended normally from the track 14 is a torch head manipulator arm assembly, generally designated 16. The torch head manipulator arm assembly 16 supports a torch head assembly, generally designated 18, having a welding tip 19 and a torch angle manipulator assembly 20. The torch angle manipulator arm assembly 20 is provided for controlling the angle of the torch head assembly 18. It is to be understood that the torch manipulator arm, head, and torch angle manipulator assemblies, as well as their relationships, are more fully described in the aforementioned United States Letters Patents, each of which is incorporated herein by reference thereto.

Since the torch manipulator arm, torch head, and torch angle manipulator are more fully described in the aforementioned United States Letters Patents, detailed descriptions thereof are omitted in the interest of brevity. However, it is to be understood that the torch manipulator arm 16, as herein disclosed, is mounted on the carriage 10 at the midsection thereof and is projected perpendicularly from the carriage.

Figure 5:
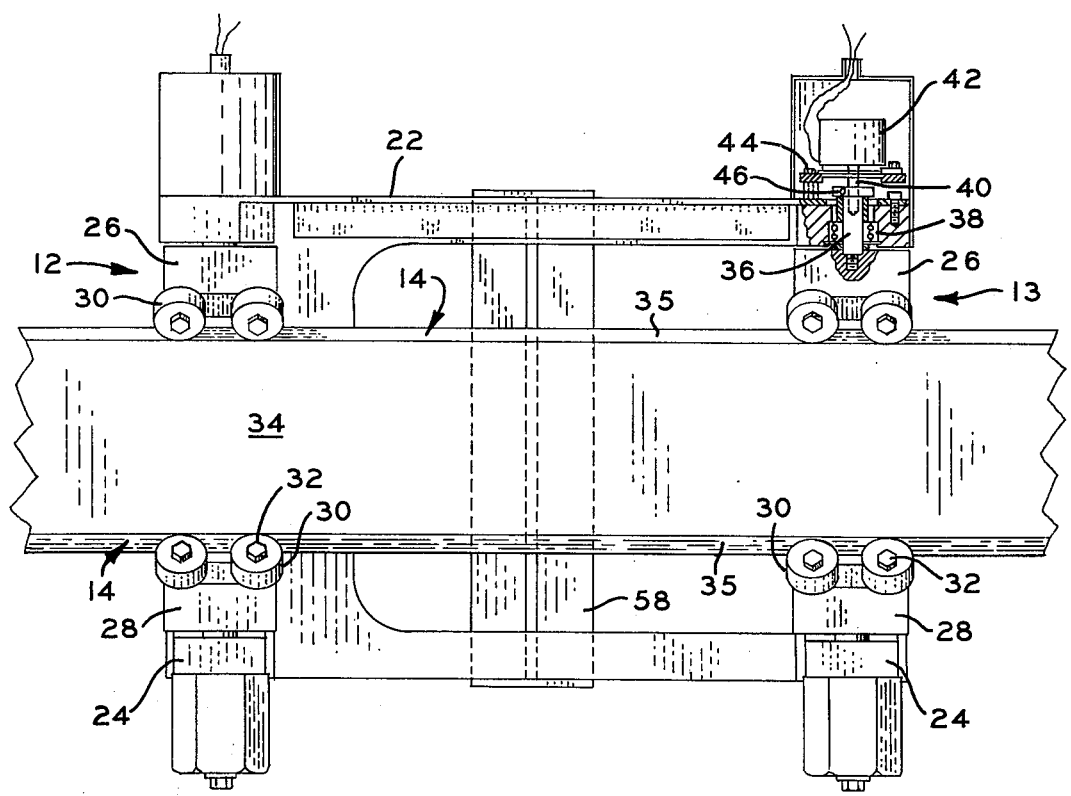
FIG. 5 is a front elevational view of the skate shown in FIG. 4.

The carriage 10, as shown, includes an elongated bed 22 supported at each of its opposite ends by one of the trucks 12 and 13. Each of these trucks, in turn, includes a C-shaped body 24, FIG. 2, having an upper roller block 26 and a lower roller block 28 pivotally connected thereto, as best shown in FIGS. 2 and 5. Each of the roller blocks includes three skate rollers 30, two of which are arranged in leading and trailing relation, FIG. 5, while the third roller, not shown, is oppositely related to the two shown. Each of the rollers 30, in turn, includes a cylindrical face disposed in concentric relation with an inclined axis. The rollers 30 are connected to the blocks 26 and 28 through a use of suitable studs 32 threaded into bores, not designated, the axes of which are inclined at 45° with respect to a vertical plane of symmetry. While not shown, it is to be understood that suitable bearings are provided for coupling the rollers 30 to the studs 32 in concentric relation therewith.

The track 14 includes an elongated web 34 having upper and lower plane bearing surfaces 35 for receiving the skate rollers 30 in rolling engagement. As a practical matter, the cross-sectional configuration of the web 34 is such that the surfaces 35 are coincident with inclined planes intersecting above and below the web, as best shown in FIG. 2.

It is important to understand that each of the roller blocks 26 and 28 is supported for pivotal displacement relative to the body 24 of the trucks 12 and 13. As best illustrated in FIG. 5, shoulder bolts 36 are threaded into the roller blocks and are projected vertically therefrom while the longitudinal axes thereof are coincident with the pivotal axis for the roller blocks. The body of each shoulder bolt 36 is connected to one of the trucks through the use of a bearing assembly 38.

Each of the shoulder bolts 36 also is provided with an axial bore, not designated, into which is inserted a shaft 40 of a potentiometer 42. The potentiometer 42, preferably, is connected to an end portion of the carriage bed 22 via suitable stand posts 44 while the shaft 40 is pinned to the shoulder bolt 36 by a suitable pin 46. Hence, as rotary motion is imparted to the shoulder bolt 36, in response to angular displacement of the roller block 26 relative to the bed 22, rotary motion is imparted to the shaft 40 of the potentiometer 42. This motion of the shaft 40 causes an electrical output intelligence to be generated within the windings of the potentiometer in a manner fully understood by those familiar with such devices. For the sake of convenience, the output intelligence generated within the windings of the potentiometer 42 rotated by the truck 12 on the drive end of the carriage is designated as analog input $\theta_1$, indicative of the angle of the carriage bed 22 with respect to a tangent to the track 14, while the output intelligence of the other potentiometer 42 is designated analog input $\theta_2$, and is indicative of the angle of the carriage bed 22 with respect to a tangent to the track at the opposite end of the carriage 22. Thus signals indicative of the angular relation of the trucks 12 and 13, with respect to tangents to the track 14, at each of the opposite ends of the skate 10 are generated. These signals serve as analog inputs, as will hereinafter become more fully apparent.

The skate 10 is driven along the track 14 through the use of a double chain drive, generally designated 48. The drive 48 includes a chain 50 attached to one surface of the web 34 and a sprocket wheel 52 meshed with the chain 50. The sprocket wheel is driven by an electrically energizable, variable speed skate drive motor 54 connected with the sprocket wheel 52 through a suitable shaft, not designated, in a manner similar to that illustrated in the aforementioned U.S. Pat. No. 3,469,068.

As a practical matter, the motor 54 is suitably mounted on a bracket 56 attached to the body 24 of the truck 13, as best shown in FIGS. 1 and 2. It should therefore be apparent that the sprocket wheel 52 is driven in rotation in response to an energization of the motor 54, and that the motor 54 comprises a variable speed motor so that the skate 10 may be advanced at a variable rate along the track 14.

It is to be noted that a bracket 57 is extended in parallelism with the bed 22 between the trucks 12 and 13. To the bed 22 and bracket 57 there is affixed a mount 58 which projects perpendicularly therefrom. As a practical matter, the longitudinal axis of the mount 58 lies in a transverse plane of symmetry for the skate 10. This mount serves to support the torch head manipulator arm assembly 16.

Briefly, a slide bar 64 is coupled with the mount 58 through suitable bearing assemblies 66 and 68, while the slide bar supports a mount 69 at its extended end. A servo motor 70 is supported by the mount 69 and is connected with an elongated screw 72 through a gearing assembly 73, FIGS. 1 and 2. The screw 72 is extended through a nut assembly 74 mounted on the bearing assembly 68 through the use of a bracket of suitable design. It should therefore be apparent that as the servo motor 70 is energized, the screw 72 is rotated in a direction and a rate determined by the direction and the rate of rotation of the output of the servo motor 70. Rotation of the screw 72, in turn, causes the screw to advance relative to the nut assembly 74. Consequently, the slide bar 64 is caused to advance, in either axial direction, through the bearing assemblies 66 and 68. Thus the slide bar is advanced along an axis lying in the aforementioned transverse plane of symmetry of the skate 10.

While the servo motor 70 is more fully described in the aforementioned patents, it is to be understood that the gearing assembly 73 also drives the wiper of a suitable potentiometer, designated 76, to provide electrical analog signal, designated L, indicative of the length of the weld arm or the varying distance between the SRL (Skate Reference Line) and the surface of the workpiece along the axis of the actuator arm assembly 16, as the skate 10 is advanced along the track 14. It also is to be understood that the servo motor 70 is controlled by an arc voltage circuit 77 which maintains a constant arc length by comparing the arc voltage with a reference voltage provided by a suitable potentiometer 78, and feeding the difference into the servo amplifier circuit 77. A tachometer 80 is connected with the torch head manipulator arm assembly 16 for purposes of providing an analog input, designated $V_R$, indicative of the rate of change of L or velocity of the manipulator arm assembly 16, in a direction paralleling the axis of the assembly 16.

The torch angle manipulator assembly 20 includes suitable servo motors which serve to displace the axis of the tip 19, in a manner more fully described in the aforementioned United States Letters Patents. It is sufficient to understand that the torch angle manipulator assembly 20 includes a torch angle drive motor 82 connected with the torch tip 19 through a push-pull assembly, generally designated 84, which serves to oscillate a pivotal mount 86 for the torch tip 19.

It should therefore be apparent that the rate at which the skate 10 is advanced along the track 14 may be varied, simply by varying the output of the skate drive motor 54, that the torch head assembly 18 may be reciprocated along a path transversely related to the skate 10, by energizing the servo motor 70, and that by oscillating the pivotal mount 86, the tip 19 is angularly displaced. Thus it is possible to achieve a constant travel speed for the tip 19 as the tip is translated at a fixed distance and at a fixed angle relative to the surface of a workpiece, the skate 10 is advanced along the contoured track 14 in general proximity to a contoured surface of the workpiece.

Figure 3:
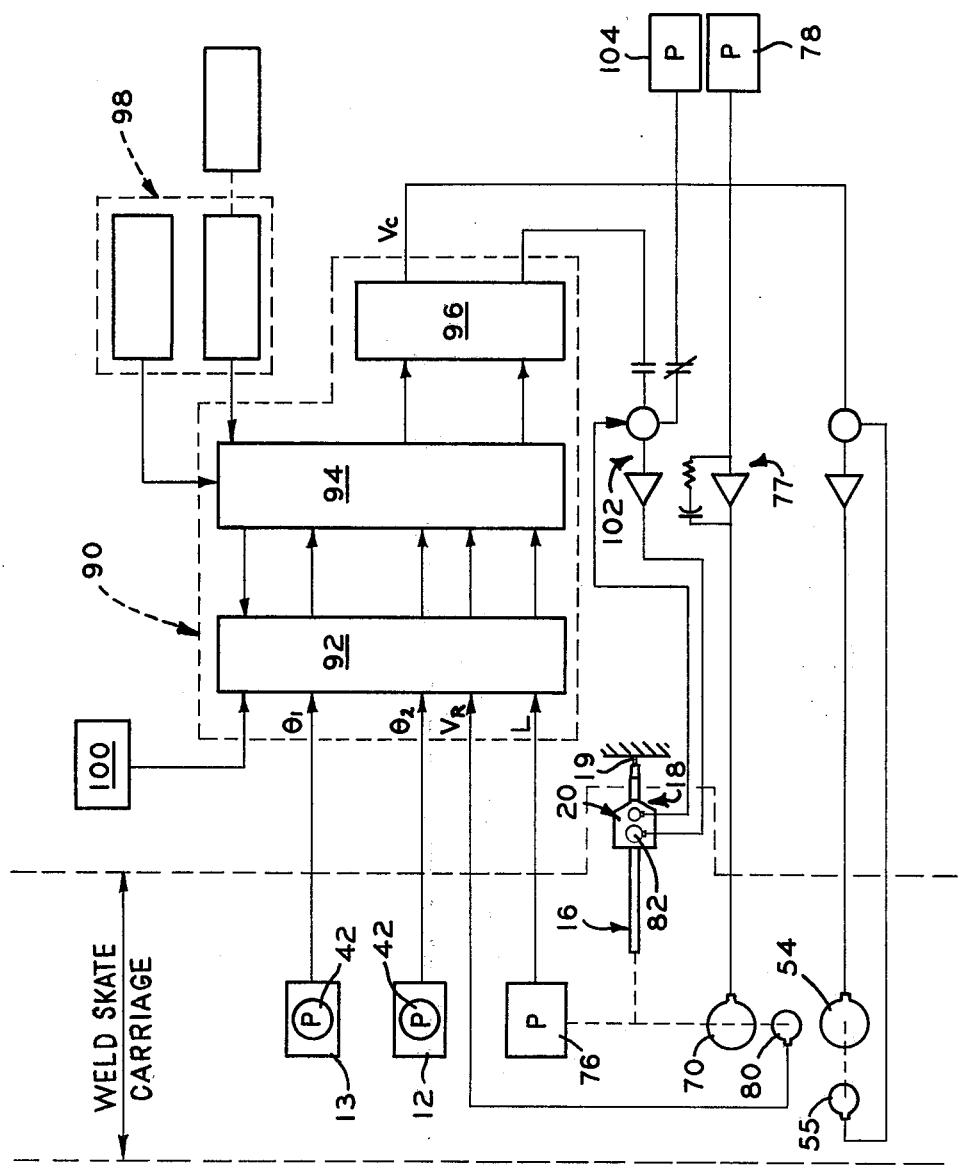
FIG. 3 is a diagrammatic view illustrating a computerized control circuit for controlling the operation of the skate shown in FIGS. 1 and 2.
Figure 4:
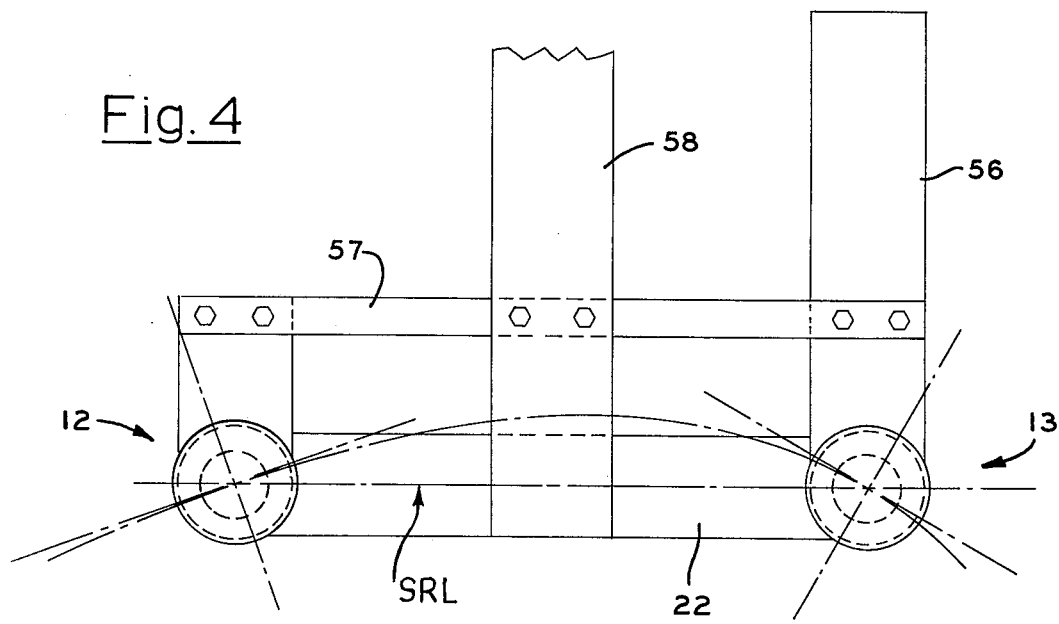
FIG. 4 is a fragmentary, top plan view of the skate shown in FIGS. 1 and 2.

Control over the operations of the skate drive motor 54 and the torch angle drive motor 82 is achieved through the use of a computer circuit, generally designated 90, diagrammatically illustrated in FIG. 3. This circuit utilizes five real-time input signals, including the analog inputs $\theta_1$, $\theta_2$, L, and $V_R$, as well as desired tip velocity input $V_T$ to continuously solve a set of general equations, hereinafter more fully described. A computer circuit analog output $V_c$ is provided at a sufficiently rapid rate to automatically speed up or slow down the weld skate 10, in order to maintain the velocity of the tip 19 constant. The general equations, in effect, mathematically define the instantaneous center of rotation of the total skate system with respect to the contoured workpiece. It is to be understood that the workpiece and track need not be parallel to each other at points along the weld.

Control over the proximity of the torch tip to the work surface is achieved in a suitable manner. In practice, where the welding process performed comprises GTA (Gas Tungsten Arc) process, a constant current weld power supply is provided. The output weld current is provided independently of the weld voltage. To achieve a desired number of watts per centimeter of work surface, an operator adjusts values between current and voltage. Since the weld power supply maintains the selected current flow at a constant level, it is possible to control voltage through a servo system driven by the torch arm manipulator for automatically increasing or decreasing the arc length. Thus, automatic adjustment of the arc length is used to maintain essentially a constant weld voltage. Proximity control for the torch tip, relative to the work surface, therefore is achieved independently of the skate computer control. It will, of course, be appreciated that for weld processes other than GTA, such as GMA (Gas Metal Arc) processes, there is no inherent proximity control built into the weld process. Consequently, a separate proximity detector is provided for use in detecting the position of the torch tip relative to the work surface. Proximity control, again, is achieved through an independent servo-control system which serves to move the torch arm in and out in order to maintain the tip at a constant distance from the workpiece.

Digressing for a moment, it is important to note that the circuit 90 includes an analog-to-digital converter 92, a digital processor 94, and digital-to-analog converters 96. Since these circuits are well known, a detailed description thereof is omitted. A program input circuit, generally designated 98, is provided for accommodating the programming of the circuit 90. As a practical manner, the input circuit 98, where desired, includes teletype, punched tape, photoreader, magnetic tape, or other common computer communication means.

As should here be apparent, analog inputs provided for the computer 90 are converted to digital inputs for the processor 94 with the output therefrom being reconverted to analog outputs.

Figure 7:
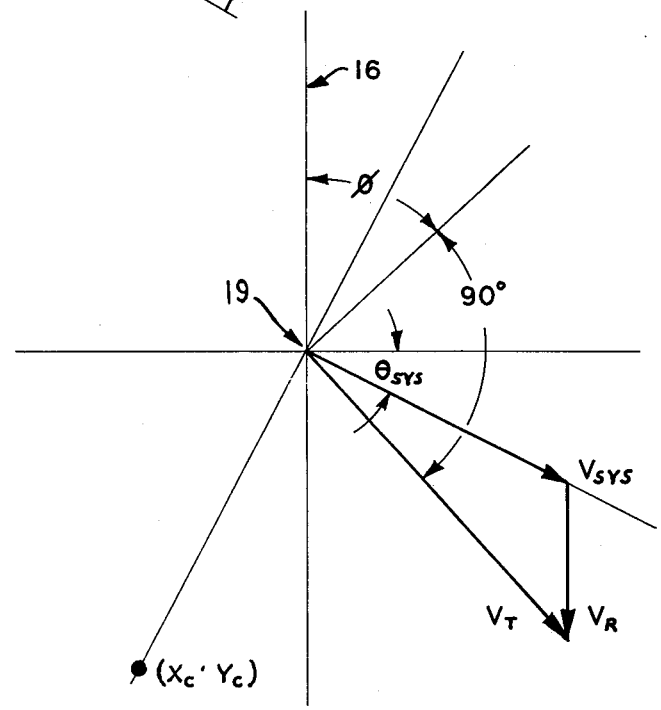
FIG. 7 is a vector diagram describing derivation of the constant velocity for the torch tip.

It has been determined that the mathematics required to achieve a constant rate for the weld tip 19 culminate in the computation of the magnitude of the skate velocity vector $V_c$, and that the head angle $\phi$ for the torch tip 19 can be controlled if the direction angle of the velocity $V_T$ is determined as graphically illustrated in FIG. 7.

As aforementioned, the analog inputs L, $V_R$, $V_T$, $\theta_1$ and $\theta_2$ are provided to the computer 90. From these inputs, the computer 90 determines an instantaneous center of rotation $(X_c, Y_c)$ for the system. The instantaneous rotational velocity at the welding tip 19 is determined and vectorially added to $V_R$, as indicated in FIG. 7, in order to complete the total definition of tip velocity vector $V_T$, which definition includes both its preset magnitude and its computed angle $\phi$. These equations are then solved to determine the necessary speed, $V_c$, needed to maintain continuing control over tip velocity vector $V_T$. Since the center of system rotation is located at infinity for a straight track, the calculations must be handled in a manner such that infinity never appears in the equations, because the digital computer cannot accept indefinable quantities such as infinity.

Figure 6:
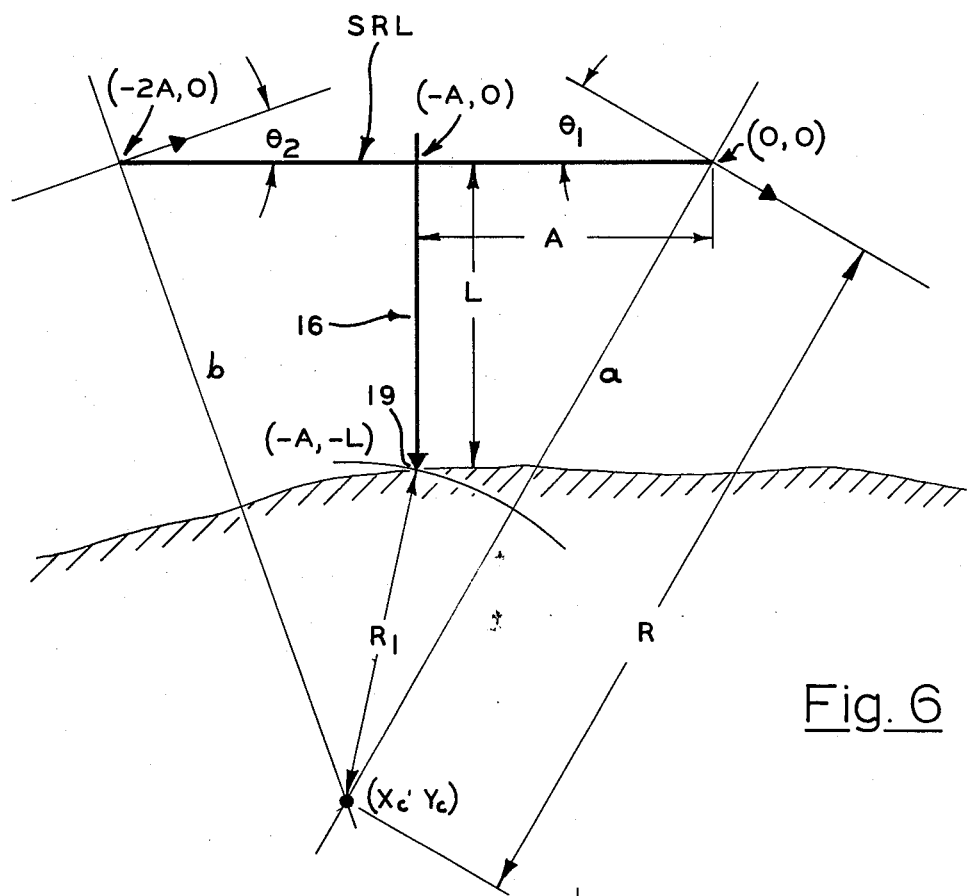
FIG. 6 is a diagrammatic view illustrating a skate carriage configuration.

With reference to FIG. 6, it will be appreciated that roller blocks 26 and 28 are identically located at opposite ends of the bed 22 of the carriage of the skate 10. These intersect points or coordinates are designated $(-2A, 0)$ and $(0, 0)$. It is assumed, for purposes of discussion, that the skate 10 is driven at coordinate $(0, 0)$. The velocity at the intersect points $(0, 0)$ is vector $V_c$. This vector describes the instantaneous speed of the skate 10 along the track 14, since it is assumed that the skate is driven at coordinate $(0, 0)$.

It is important to note that the lines designated $a$ and $b$ intersect the instantaneous radius R at $(X_c, Y_c)$, and the angular displacement of the roller blocks 26, from the axis of the bed 22 are designated angles $\theta_1$ and $\theta_2$. It should be noted also that angle $\theta_1$ is assumed to be located at the driven end of the skate 10. The torch tip 19, mounted on the torch manipulator arm assembly 16, is located at point $(-A, -L)$. A GTA (Gas Tungsten Arc) welding arc voltage control, or proximity detection system, which also includes the circuits 77 and 78, serves to control the operation of the servo motor 70 in a manner such that the torch manipulator arm assembly 16 is reciprocated for maintaining the tip 19 at a constant distance from the surface of the work, as the skate 10 traverses the track 14.

In order to simplify the required mathematics, it is convenient to assume that the manipulator arm 16 is located at point $(-A, 0)$, which is equidistant from coordinates $(-2A, 0)$ and $(0, 0)$. Finally, radius $R_1$ is defined as the distance from the instantaneous center of rotation $(X_c, Y_c)$ to the torch tip 19 located at point $(-A, -L)$.

FIGS. 6 and 7 collectively describe the torch tip velocity vector $V_T$ as being the summation of vectors $V_{sys}$ and $V_R$ where $V_R$ is the instantaneous velocity of the manipulator arm and $$V_{sys} = \sqrt{V_T^2 - V_R^2 \cos^2 \theta_{sys}} - V_R \sin \theta_{sys}$$

The desired velocity of the torch tip, $V_T$, is one of the two parameters which is computer controlled. As a practical matter, $V_T$ is held constant at a speed required to perform the desired welding process. Therefore, $V_T$ is an input to the computer 90 from a travel speed potentiometer, designated 100, and is manually selected on an operator's welding controlled handbox, not shown.

Because the weld travel speed $V_T$ is a constant factor, the computer 90 must calculate $V_c$, the required weld skate speed.

$V_c$, the instantaneous welding skate speed, is calculated by the computer according to the equation $$V_c = R/R_1 (\sqrt{V_T^2 - V_R^2 \cos^2 \theta_{sys}} - V_R \sin \theta_{sys})$$

where $$\frac{R}{R_1} = \frac{2 \cos \theta_2}{\sqrt{\left[1 + \left(\frac{L}{A}\right)^2\right] \sin^2 (\theta_1 + \theta_2) + 4 \cos \theta_1 \cos \theta_2 \left[\cos (\theta_1 + \theta_2) - \frac{L}{A} \sin (\theta_1 + \theta_2)\right]}}$$

where
$A = $ one-half of the distance between said trucks, and is a constant in the computer program.

Thus the computer accepts easily measured inputs and computes the required increase or decrease in speed of the weld skate 10 to maintain a constant velocity for the weld tip 19. Since the equations are general, there are no theoretical restraints on the curvature of either the track or the part to be welded, except practical considerations such as speed and feed limitations of the equipment.

It should at this juncture, be noted that the system can be employed to perform cutting operations as well as welding operations and that the invention is adaptable to joint preparation prior to welding, as well as to weld processes other than gas tungsten arc welding, such as electron beam, laser, metal tungsten arc, submerged arc and other current types of weld process.

As earlier stated, another parameter controlled by the skate 10 is the torch angle, designated $\phi$. By the law of similar triangles, it can be seen from inspection of FIGS. 6 and 7 that if it is desired to maintain the torch normal to a tangent to the workpiece, then the instantaneous angle $\phi$ that the torch makes with the longitudinal axis of symmetry for the manipulator arm 16 is:

$$\text{Torch Angle } \phi = \arcsin \frac{V_R + V_{sys} \sin \theta_{sys}}{V_T}$$

Substituting for $V_{sys}$, $$\sin \phi = \frac{V_R + V_c \left(\frac{R_1}{R}\right) \sin \theta_{sys}}{V_T}$$

Thus, by solving the last mentioned equation, the computer constantly provides the sine of the torch angle as a binary signal to the digital-to-analog converter circuit 96, which, in turn, feeds the output from the circuit 96 to the torch angle position feedback and signal amplifier circuit 102.

OPERATION

It is believed that in view of the foregoing description, the operation of the device will readily be understood and it will be briefly reviewed at this point.

An absolute binary program is fed to the computer circuit 90 via the program input circuit 98 in a manner well understood by those familiar with such devices. During welding the torch manipulator arm is automatically positioned by the standard GTA weld process arc voltage control technique to maintain the weld voltage selected on potentiometer 78. Thus, proximity of the torch tip to the worksurface is controlled by the conventional GTA weld process. The initial torch angle for weld start is established by adjusting torch angle bias potentiometer 104. After the weld arc is established and travel is initiated, torch angle positioning is automatic by means of the computer and said sensors. As the weld skate is advanced along the track 14, the roller blocks 26 and 28 rotate relative to the ends of the bed 22 of the skate 10 through angles $\theta_1$ and $\theta_2$. The welding arc voltage control serves to continuously reposition the torch manipulator arm 16 so that the distance between the tip 19 and the surface of the workpiece remains substantially constant as the skate 10 traverses the track 14. The potentiometers 42 and 76 provide analog inputs to the analog-to-digital converter 92 which inputs are then converted to binary inputs and the general equation, aforementioned, is solved for $V_c$, the output being directed through skate drive amplifier and tachometer feedback circuits, not designated, to the motor 54 for varying the speed of the skate. The rate at which the skate is advanced is such that the velocity of the weld tip 19 remains substantially constant and is equal to the analog input selected from potentiometer 100. Thus the speed of the tip 19 remains constant.

Simultaneously, a binary torch angle signal is fed to the digital-to-analog converter circuit 96 with the output thereof being directed through the torch angle amplifier circuit 102 to the torch angle drive motor 82, for maintaining the torch angle $\phi$ constant in accordance with the torch angle equation herein-before discussed.

In view of the foregoing, it should readily be apparent that the computerized system which embodies the principles of the instant invention overcomes the instability exhibited by the system of U.S. Pat. No. 3,469,068 whenever crossing any joint in the skate track, and, in addition, a track radius transducer heretofore used to measure the instantaneous radius of the skate track is not required. Finally, through the use of five real-time input signals to continuously solve a set of general equations, accuracy is improved and complexity is reduced.

It should, of course, be apparent that where desired the system herein disclosed may be so modified as to provide for a stationary skate while the workpiece is translated relative to the skate whereby the motion of the work surface is controlled by the computer output through means similar to the control means hereinbefore described. In such a modification, the constant radius of rotation is determined by the settings of $\theta_1$ and $\theta_2$ within bounds explained herein so that the workpiece never gets too near the weld skate radius of rotation (as determined by $\theta_1$ and $\theta_2$). Of course, constant values for $\theta_1$ and $\theta_2$ could, as an option, be entered in the program in lieu of actually connecting the potentiometers $\theta_1$ and $\theta_2$, as shown in FIG. 3.

Although the invention has been herein shown and described in what is conceived to be the most practical and preferred embodiment, it is recognized that departures may be made therefrom within the scope of the invention, which is not to be limited to the illustrative details disclosed.

We claim:

1. A computerized system for translating a torch head at a constant travel rate along an elongated track of a noncritical configuration adjacently related to a workpiece of a configuration generally conforming to the shape of the track comprising:
   A. an elongated track of an arbitrary configuration extended in spaced juxtapositional relation with the surface of the workpiece;
   B. a skate including a pair of trucks having mounted thereon a carriage bed, said trucks being supported for independent pivotal motion relative to the carriage bed, and are arranged in mutually spaced leading and trailing relation along said track and supported thereby for translation therealong;
   C. a working assembly mounted on said skate including a torch head manipulator arm extended perpendicularly from the midportion of said carriage bed, a torch head mounted at the extended end of the arm and supported thereby for translation in a spatial relationship with said working surface, and means for imparting axial motion to said arm for maintaining constant the spatial relationship of tip to workpiece;
   D. drive means mounted on said skate at one end thereof engaged with said track and having a variable drive speed for advancing said skate at a variable rate along said track; and
   E. drive control means including an equation solving circuit connected to said drive means for varying the drive speed in a manner such that the torch head is advanced along said working surface at a constant travel speed, comprising:
     first sensing means for continuously sensing the angular relation of each end of said carriage with instantaneous tangents to the track for providing a pair of varying computer input signals, second sensing means for sensing the spatial relationship of said torch head with a geometrically fixed skate reference line, third sensing means for continuously sensing the rate of axial motion imparted to said manipulator arm necessary for providing another varying computer input signal indicative of the rate of positional change, further sensing means for manually pre-setting a constant speed of the torch head as it translates along said work surface, and a computer circuit connected with said first, second, third and fourth sensing means for detecting variations in said input signals and providing a speed control output signal to said drive means for varying the output thereof substantially simultaneously with variations in said computer input signals, whereby real-time control over said drive means is achieved.

2. The improvement of claim 1 wherein each trunk of said pair of trucks includes a body of an elongated configuration and multiple pairs of wheels mated with linear surfaces of said track supporting said body in parallelism with the instantaneous tangent to the track.

3. The improvement of claim 2 wherein the first sensing means includes a pair of potentiometers mounted on said carriage bed having a rotary input connected with said pair of trucks.

4. The improvement of claim 2 wherein said skate is advanced at a variable speed in accordance with the equation:

$$V_c = R/R_1 (\sqrt{V_T^2 - V_R^2 \cos^2\theta_{sys}} - V_R \sin \theta_{sys})$$

where $V_c$ = the required speed for the skate, and where $$\frac{R}{R_1} = \frac{2 \cos \theta_2}{\sqrt{\left[1 + \left(\frac{L}{A}\right)^2\right]\sin^2(\theta_1 + \theta_2) + 4 \cos \theta_1 \cos \theta_2 \left[\cos(\theta_1 + \theta_2) - \frac{L}{A} \sin(\theta_1 + \theta_2)\right]}}$$

$V_T$ = the constant rate for said torch tip
$V_R$ = rate of change of L
$\theta_{sys}$ = theoretical angle subtended by the total system velocity vector, $V_{sys}$, and the SRL
$L$ = distance between torch tip and the SRL
$A$ = one-half of distance between the truck axes
$\theta_1$ = angle of SRL with respect to a tangent to the track at the driven end of the skate
$\theta_2$ = angle of SRL with respect to a tangent to the track at the opposite end of the skate.

5. The improvement of claim 2 further comprising means for maintaining the axis of said torch head at a fixed angular relation with said contoured work surface.

6. The improvement of claim 2 further comprising means for controlling said torch head to maintain a pre-set torch angle normal to the work surface, the sine of which, relative to the longitudinal axis of the torch head manipulator arm, is equal to $$\frac{V_R + V_c\left(\frac{R_1}{R}\right)\sin \theta_{sys}}{V_T}$$

where $V_c$ is equal to $$R/R_1 (\sqrt{V_T^2 - V_R^2 \cos^2\theta_{sys}} - V_R \sin \theta_{sys}).$$

* * * * *